United States Patent
Gauny et al.

(10) Patent No.: US 10,937,065 B1
(45) Date of Patent: Mar. 2, 2021

(54) OPTIMIZING PRIMARY CONTENT SELECTION FOR INSERTION OF SUPPLEMENTAL CONTENT BASED ON PREDICTIVE ANALYTICS

(71) Applicant: Amazon Technologies, Inc., Reno, NV (US)

(72) Inventors: Ronnie Dean Gauny, Cedar Park, TX (US); Andrew Christopher Chud, Austin, TX (US); Scott Anthony Siegler, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/429,322

(22) Filed: Jun. 3, 2019

(51) Int. Cl.
*G06Q 30/02* (2012.01)
*H04N 21/234* (2011.01)

(52) U.S. Cl.
CPC ... *G06Q 30/0271* (2013.01); *H04N 21/23418* (2013.01); *H04N 21/23424* (2013.01)

(58) Field of Classification Search
CPC ......... G06Q 30/0271; H04N 21/23418; H04N 21/23424; H04N 21/233; H04N 21/234; H04N 21/251; H04N 21/252; H04N 21/25841; H04N 21/25883; H04N 21/25866; H04N 21/25891; H04N 21/4508; H04N 21/4524; H04N 21/4532; H04N 21/466; H04N 21/4667
See application file for complete search history.

(56) References Cited

U.S. PATENT DOCUMENTS

| | | | | |
|---|---|---|---|---|
| 8,335,719 | B1* | 12/2012 | Quraishi | G06Q 30/0241 705/14.49 |
| 8,386,509 | B1* | 2/2013 | Scofield | G06F 16/335 707/769 |
| 8,655,727 | B2* | 2/2014 | Scholl | G06Q 30/0242 705/14.54 |
| 8,799,401 | B1* | 8/2014 | Bryar | G06F 16/5846 709/217 |
| 8,849,945 | B1* | 9/2014 | Desjardins | G06F 16/9558 709/217 |
| 9,760,778 | B1* | 9/2017 | Wakim | G06K 9/00671 |
| 2014/0109123 | A1* | 4/2014 | Balakrishnan | H04N 21/252 725/14 |
| 2014/0195890 | A1* | 7/2014 | Taylor | G06F 16/00 715/234 |

(Continued)

*Primary Examiner* — Alexander Gee
(74) *Attorney, Agent, or Firm* — Hogan Lovells US LLP

(57) ABSTRACT

Supplemental content associated with an advertising campaign may be evaluated by an object recognition service to classify the content using ad classification key words. The classification of the supplemental content may be used, along with publisher content descriptions associated with primary content, to identify targeting criteria for the supplemental content that may have a success metric above a threshold. Past campaigns deployed against primary content having similar publisher content descriptions may be evaluated to determine how certain key words or targeting criteria perform. If historical results are positive, the targeting criteria may be added to existing campaigns or approved for existing campaigns. Predicted success of the targeting criteria may be used to provide recommendations to users who control which primary content the supplemental content should be included.

20 Claims, 11 Drawing Sheets

(56) References Cited

U.S. PATENT DOCUMENTS

| | | | |
|---|---|---|---|
| 2014/0310756 A1* | 10/2014 | Canney | H04N 21/221 |
| | | | 725/86 |
| 2017/0091828 A1* | 3/2017 | Siegler | G06Q 30/0269 |
| 2017/0091829 A1* | 3/2017 | Siegler | G06Q 30/0277 |
| 2017/0295411 A1* | 10/2017 | Sandholm | H04N 21/2668 |
| 2018/0091850 A1* | 3/2018 | Sandholm | H04N 21/442 |

* cited by examiner

US 10,937,065 B1

OPTIMIZING PRIMARY CONTENT SELECTION FOR INSERTION OF SUPPLEMENTAL CONTENT BASED ON PREDICTIVE ANALYTICS

BACKGROUND

As people are consuming an increased amount of video content, advertisements may be integrated into video content to reach wider audiences. Advertisers may provide supplemental content for viewing during the primary video content and may target certain primary content based on a variety of factors. For example, key words may be provided to service providers to execute various advertising campaigns, which may be based on one or more specified criteria. The key words and one or more criteria are often developed by the advertisers themselves, and as a result may not select the best context in which to show advertisements. Displaying the ads in sub-optimal context may lead product sub-optimal results (e.g., conversions, brand recognition, etc.), which may lead advertisers to believe their ads are ineffective, but often the context where the advertisements are shown is to blame.

BRIEF DESCRIPTION OF THE DRAWINGS

Various embodiments in accordance with the present disclosure will be described with reference to the drawings, in which.

DETAILED DESCRIPTION

Figure 1:
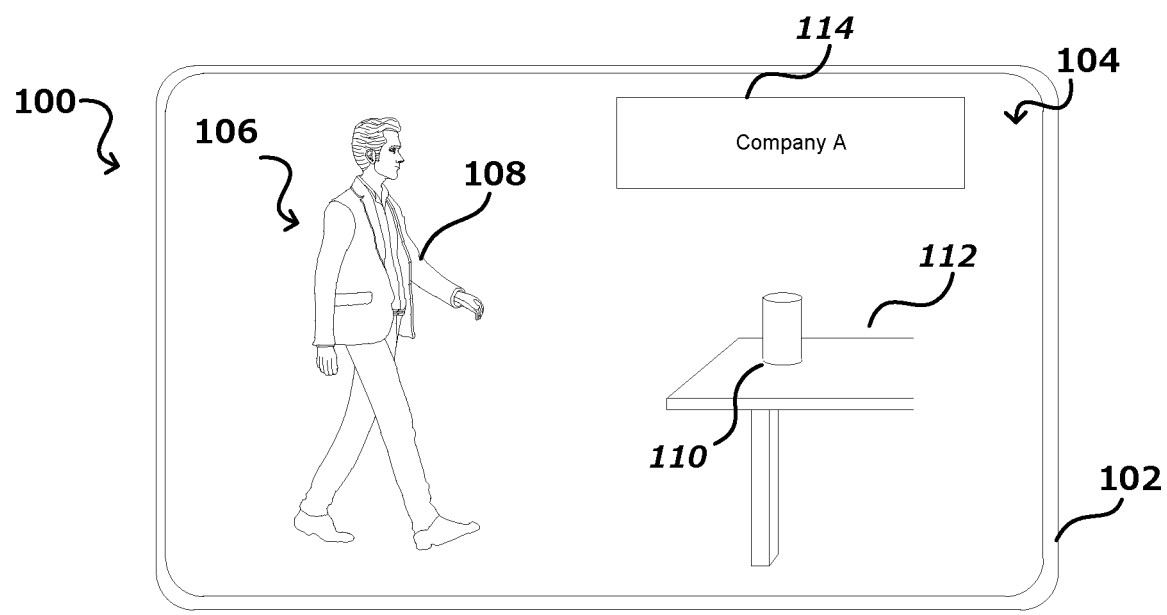
FIG. 1 illustrates an example environment in which aspects of the various embodiments can be utilized.

Systems and methods in accordance with various embodiments of the present disclosure overcome one or more of the above-referenced and other deficiencies in conventional approaches to targeting advertisements with appropriate criteria. In particular, various embodiments enable the identification and classification features or objects in supplemental content (e.g., video, audio, text, etc.) that may be integrated with primary content. Identification and classification may be accomplished using image recognition, text recognition, speech recognition, and other such approaches. The identification and classification can be used to classify individual objects and/or scenes within the supplemental content, and thereafter, identify key words associated with the classified scenes or objects within the supplemental content. In various embodiments, the key words may be utilized to compare historical information for advertisements having similar key words in order to provide improved targeting criteria.

In various embodiments, predictive analytics may also be utilized in order to predict a success rate for one or more key words and/or one or more specified criteria (e.g., instructions for when to play the advertisement, identification of particular primary content, etc.). For example, machine learning methods may be utilized to receive one or more key words, evaluate the success of those key words, for example other supplemental content also including those key words, in other types of inventory (e.g., primary content), and return a score related to performance of associated supplemental content with the primary content. In other words, the machine learning model may be trained to evaluate success of past campaigns having certain key words or targeting criteria presented with certain types of primary content and other criteria to determine how future campaigns may perform.

Embodiments of the present disclosure include analyzing content (e.g., supplemental content), such as video content, using one or more machine learning systems that may be utilized to classify particular scenes and/or images within the content. Identified content and/or features representative of the content can be received at an advertisement server that includes a content classifier module. The content classifier module can compare identified content and/or features representative of the content with one or more pieces of defined data (such as one or more words or a combination of words). Additionally, the content classifier module can compare features representative of the content to stored features to identify an object in the content For example, the classifier may identify objects (e.g., cars, appliances, etc.), people (e.g., actors, characters, etc.), or scenes (e.g., car chases, dinners, dancing, etc.) within the content. Moreover, in various embodiments, the classifier may also be trained to recognize associated or non-intuitive correlations with the identified objects, as will be described below.

In various embodiments, advertisers may develop campaigns to present supplemental content (e.g., advertisements, secondary content, creative) that may be shown before, during (e.g., interspersed with), or after primary content. The campaigns may include a list of line items that identify and/or associate various portions of the creative aspects (e.g., the supplemental content) of the campaign and also criteria, which may be referred to as targeting criteria, (e.g., primary content, demographic information, time frames, content types, etc.) for showing and/or utilizing the supplemental content. For example, a line item may include targeting criteria (e.g., a set of rules for key/value pairs where the creatives should show). Publishers also may associate key/value pairs with their primary content. During broadcast, the publisher may request, from an ad server, for example, an advertisement be shown during an advertising break. The ad server, in various embodiments, may select supplemental content that best matches the line item targeting criteria against the key/value pairs in the content. Unfortunately, in various embodiments, characteristics of the creative may include sub-optimal associations because, for example, the characteristics of the creative are often human-generated, and as a result, may miss or misinterpret certain features of the advertisement.

Embodiments of the present disclosure may select targeting criteria to put on creative line items based on certain characteristics of the creative, which may be identified via a machine learning analysis of the creative. Accordingly, advertisers may be provided information regarding likely success for their campaign or for particular creative that makes up a campaign, which may sway or otherwise encourage advertisers to select or associate different characteristics of their creative with various targeting criteria. For example, if a determined score for certain creative, based on the provided characteristics of the creative, are below a threshold value, different characteristics may be recommended that are predicted to have a higher score. Moreover, if certain aspects of the criteria are driving a score lower than the threshold, then different criteria having a higher predicted score may also be recommended.

For example, an advertisement for soda may be evaluated to determine various characteristics of the creative content. In embodiments, image identification may be utilized to identify key words associated with the advertisement such as "beverage", "drink", "sunshine", and "smile." This creative and the associated key words may be available from an ad server when a publisher presents different types of primary content. In an example that includes three primary content streams, the advertisement may be paired with the primary content stream best suited (e.g., highest ranked or highest scored) for including the primary content. In various embodiments, the primary content streams may use different sets of key/value pairs. For example, a first primary content stream may be for a fishing show that uses key/value pairs such as "channel:discovery", "genre:sport", "sport:fishing" while a wilderness survival show uses key/value pairs such as "channel:discovery", "genre:realityTV", "adult:true", "outdoors:true." A third primary content stream, for example showing a football game, may include key/value pairs such as "channel:espn", "genre:sport", "sport:football", "team:ArizonaCardinals." Embodiments of the present disclosure may utilize a predictive analytics model that includes as input the targeting criteria and identifying key words from a large number of ads and the success metrics for those tuples. Accordingly, for the example using the soda campaign above, the key words "beverage", "drink", "sunshine", "smile" may be evaluated to suggest targeting criteria which has historically shown to increase a success metric, which may be defined by the advertiser. In this example, previous "beverage" advertisements that targeted "sport:football" AND "team:ArizonaCardinals" may have included an increased success metric, and as a result, it may be recommended to show the advertisement during the third primary content stream.

FIG. 1 illustrates an example situation 100 wherein a computing device 102 is playing a scene 104 of video content 106, which may be supplemental content, such as content associated with an advertisement. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others.

In this example the device 102 can render video content for playback. The video content in the illustrated embodiment is from an advertiser, and may be referred to as supplemental content or creative that is shown in addition to other content, such as primary content. The video content 106 may be provided by an advertiser for use with an advertising campaign. It should be appreciated that while the illustrated content 106 may be video content, the content can include text, images, audio data, etc. In accordance with an embodiment, video content 106 can include text, video, audio, or a combination thereof. As a user watches primary content, the video content 106 for the advertisement may appear, for example, before, after, or during the primary content. The advertisements may be provided in exchange for a lower cost or no-cost viewing arrangement for the viewer, however, it should be appreciated that the advertisements may also be presented as a condition of utilizing the service.

The illustrated supplemental content of FIG. 1 includes the scene 104 where a man 108 is walking into an establishment that includes a canned beverage 110 on a table 112. Additionally, signage 114 for Company A is arranged in the background. In various embodiments, the canned beverage 110 may be related to or be from Company A, thereby indicating that the advertisement is for Company A. As will be described below, the scene 104 may be evaluated, in various embodiments, by a classifier to identify one or more items or themes associated with the themes for use with providing line items for advertising purposes, among other things.

Figure 2:
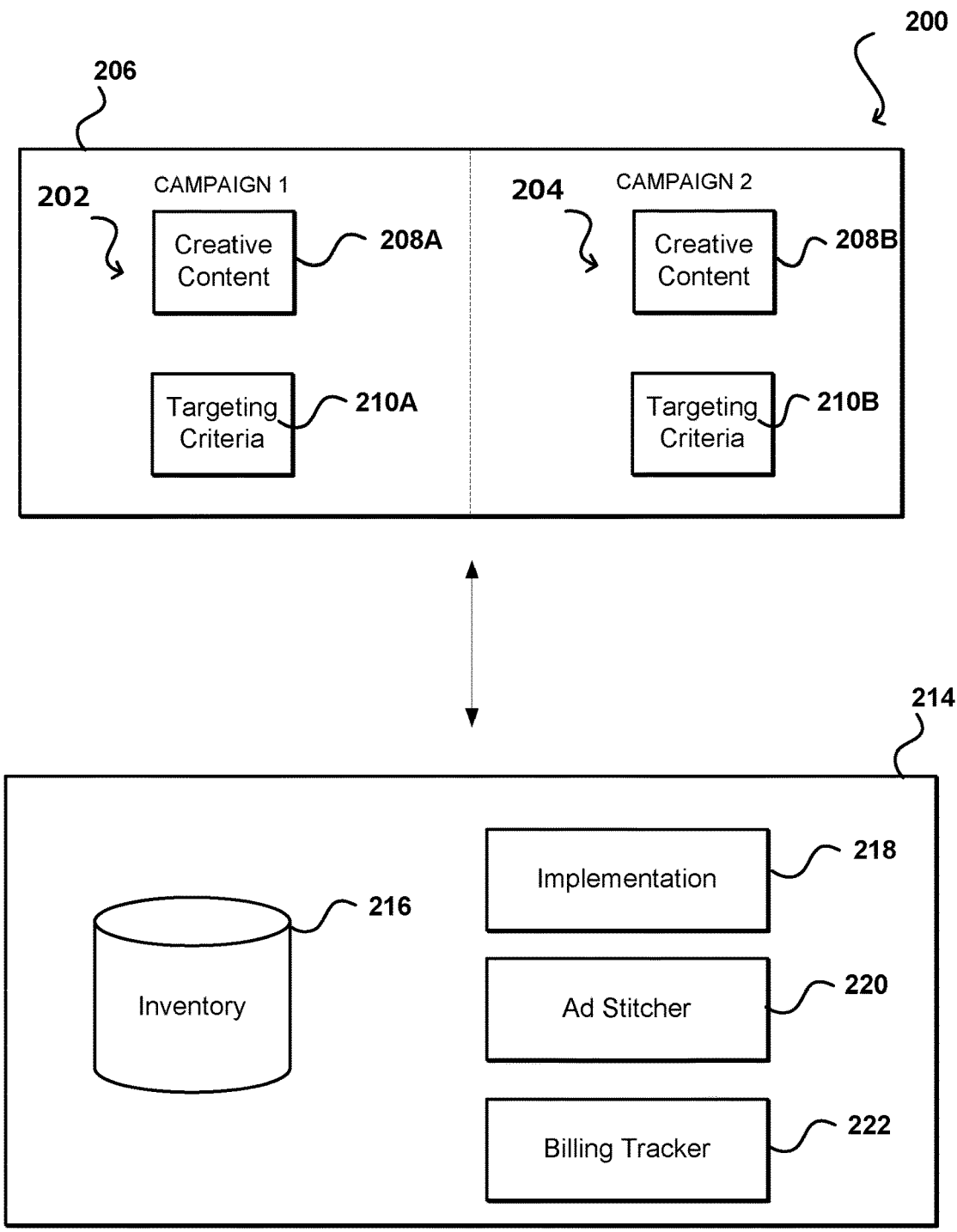
FIG. 2 illustrates an example system for implementing supplemental content with primary content that can be utilized in accordance with various embodiments.

FIG. 2 illustrates an example advertising platform 200 where advertisers provide campaigns 202, 204 via an advertiser environment 206. Each campaign includes creative content 208A, 208B and targeting criteria 210A, 210B, which may form a line item. It should be appreciated that in various embodiments campaigns may include one or more line items, and the embodiment of FIG. 2 of one line item per campaign is for illustrative purposes only. Moreover, it should be appreciated that the campaigns may also include other information, rules, criteria, and the like and that the embodiment illustrated in FIG. 2 is for illustrative purposes only. The creative content modules 208A, 208B may include the advertisement content, such as video content, audio content, text content, or a combination thereof. The creative content, as will be described below, may be analyzed to identify objects or the like to facilitate formulation of improved targeting criteria. The targeting criteria 210A, 210B may include key words provided by the advertisers that may be utilized to deploy the creative content. For example, the key words may focus on the content of the ad and/or be directed toward where the ad should be deployed. As an example, creative content of a basketball player dunking a ball and then having a sports drink may include key words such as "basketball" or the player's name or the sports drink company. Furthermore, in various embodiments, the targeting criteria 210A, 210B may further provide information directed to where the campaigns may be deployed. For example, the targeting criteria may include a set of rules or other criteria, such as demographic information, times of deployment, particular genres or types of primary content, and the like. Accordingly, each campaign may be provided to a content provider for integration into various types of content.

The advertising platform 200 illustrated in FIG. 2 further includes a provider environment 214 that receives the advertising campaigns 202, 204 for deployment. The illustrated provider environment 214 includes an inventory data store 216. Inventory may refer to different primary content available for inclusion of supplemental content. The provider environment 214 further includes an implementation module 218, an ad stitcher 220, and a billing tracker 222. In the illustrated embodiment, the implementation module 218 evaluates the campaigns 202, 204 to determine how the campaigns may be deployed. For example, the implementation module 218 may evaluate the key words against a list of inventory associated with those key words. Furthermore, the implementation module 218 may also analyze the criteria to determine which inventory falls within limits established by criteria, such as time of day certain content is shown. The illustrated ad stitcher 220 integrates the supplemental content with the primary content from the inventory 216. For example, the ad stitcher 220 may arrange the supplemental content to play during a predetermined commercial break. The billing tracker 222 may record features of the campaign for billing purposes. For example, billing may be on a flat fee basis, a view basis, a click basis, or the like. Accordingly, in traditional systems, advertisers typically control how and where creative is deployed.

In various embodiments, systems and methods of the present disclosure may provide additional suggestions for the line items associated with advertising campaigns, thereby increasing the types of inventory that may be associated with the campaigns. This increase in inventory may provide additional viewers, which the advertisers may not have thought to include, which could improve conversions or another success metric. As will be described below, in various embodiments, machine learning methods may be utilized to analyze the creative content to determine key words associated with creative content. Moreover, in various embodiments, these key words may be analyzed, with their associated targeting criteria, using a predictive method to estimate a likelihood of success of certain key words and/or criteria for deploying advertising content, which may be based at least in part on historical information for other advertisements using similar key words and/or targeting criteria. The likelihood of success may be scored and, in various embodiments, targeting criteria that does not meet a threshold may be discarded. Accordingly, improved campaigns may be developed.

Figure 3:
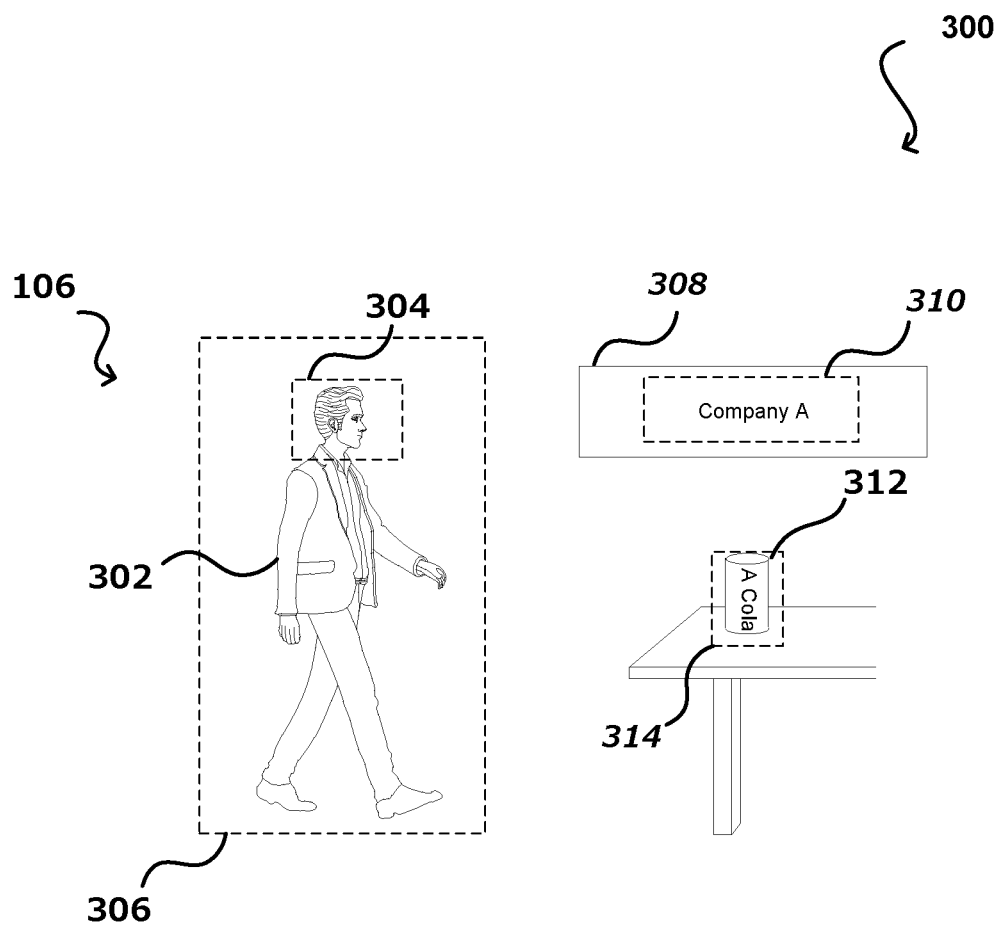
FIG. 3 illustrates an content evaluation environment that can be utilized in accordance with various embodiments.

FIG. 3 illustrates an example 300 of identifying content from video data, such as the video data 106 from FIG. 1. As described above, the video data 106 may be supplemental content, such as a video advertisement. As will be described below, the video data 106 may be segmented into one or more reference frames or keyframes. In the illustrated embodiment, the reference keyframe includes a representation of a person 302. The keyframe can be analyzed utilizing face or head detection algorithms to attempt to locate an approximate head or face portion in the keyframe. In this example, a region 304 identifies a face of the person 302 while a region 306 generally identifies a body location of the person 302. In various embodiments, a body location can be estimated to be a distance from the facial region. In various embodiments, a body detection algorithm can be used instead of or in conjunction with the face or head detection algorithms.

FIG. 3 further illustrates an advertisement 308 for Company A and a region 310 that identifies the phrase "Company A" from the advertisement 308, for example, utilizing optical character recognition (OCR). Additionally, a beverage container 312 is identified within region 314. In some embodiments, a feature detection, computer vision, corners detection, or other such algorithm or process can be used to process the keyframe in order to determine information about the pattern and/or color(s) that should be used for searching. Any appropriate information useful for searching for an item based on a type and pattern and/or color information can be used as well within the scope of the various embodiments. In the situation where an item is found, such as the beverage container 312, such information can be provided to an advertisement server to determine relevant key words based on the beverage container 312.

In some embodiments, the matching process might also include a general image matching processes. Such an approach can be advantageous in situations such as where the pattern corresponds to an image on a t-shirt, which might correspond to a brand or product. If the brand or product can be recognized, the search results can be modified to include other types of items that include representations of the brand or product.

Figure 4:
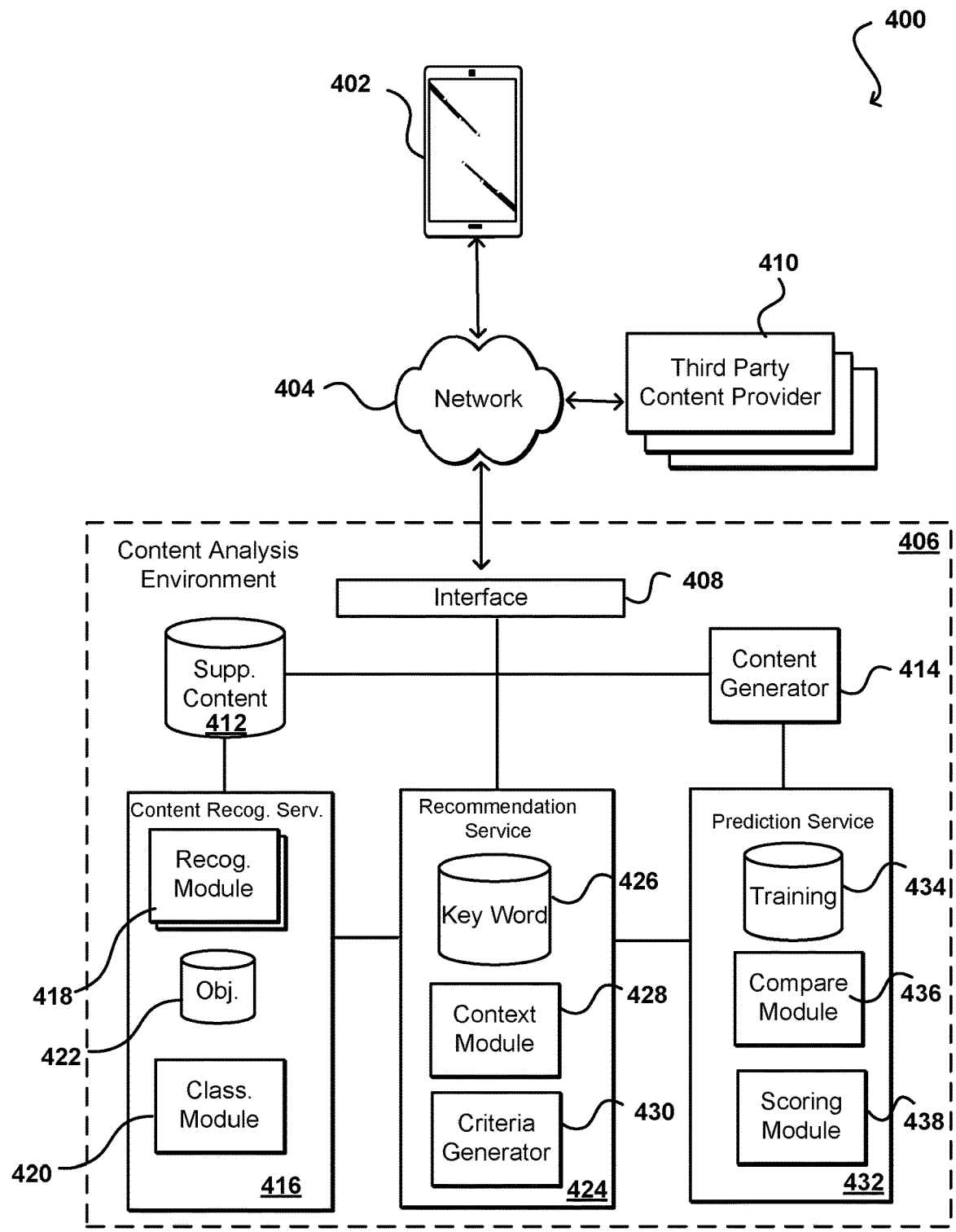
FIG. 4 illustrates an example system for evaluating supplemental content that can be utilized in accordance with various embodiments.

FIG. 4 illustrates an example advertisement analysis system 400, in which aspects of the various embodiments can be implemented. In this example, a client computing device 402 can submit a request for content across at least one network 404 to be received by a content analysis environment 406. This can include a request for specific content or a subscription to have content pushed to the client device 402, among other such options. In at least some embodiments the request can include a request for content to be displayed on, or presented via, the computing device 402, and in many cases will include video, audio, or other media content that is encoded for presentation by the client device 402. The network(s) can include any appropriate network, such as the internet, a local area network (LAN), a cellular network, an Ethernet, or other such wired and/or wireless network. The content analysis environment 406 can include any appropriate resources for providing content from a resource provider, as may include various servers, data stores, and other such components known or used for providing content from across a network (or from the "cloud"). As mentioned elsewhere herein, the client computing device 402 can be any appropriate computing or processing device, as may include a desktop or notebook computer, smartphone, tablet, wearable computer (i.e., smart watch, glasses, or contacts), set top box, or other such system or device. An interface layer 408, when receiving a request or call, can determine the type of call or request and cause information to be forwarded to the appropriate component or sub-system. These calls or requests can also come from third parties, such as streaming content providers who utilize the resources of the content analysis environment 406, and third party providers 410 can provide at least some of the media content that is either distributed to the user and/or utilized as supplemental content, which may be stored in a supplemental content data store 412, to be integrated with other primary content.

In this example, a call or request received to the content analysis environment 406 can be received by an interface layer 408 of the environment. As known for network environments, the interface layer can include components such as interfaces (e.g., APIs), load balancers, request and/or data routers, and the like. If the request is a request for content, such as for a video data stream to be provided to the client device 402, information for the request can be directed to one or more content generators 414, which may evaluate the request and provide primary content, supplemental content, or a combination thereof As described above, in various embodiments supplemental content may include one or more content items such as such as an image(s), audio, text, and/or video(s). In this example, the system includes a content recognition service 416. The content recognition service 416 can be implemented using software and/or hardware and can be configured to receive the supplemental content (or data representative of the content). The content recognition service 416 can include a recognition module 418, which may be utilized for object recognition, audio recognition, text recognition, or any combination thereof. The recognition module 418 can, for example, be and/or include an object recognition module that performs one or more image matching approaches as is used in computer vision, object recognition, motion tracking, three-dimensional (3D) modeling, and the like, which can be performed to identify relevant items such as products or other objects to enable classification of various components of the content. Example approaches include face and human detection, apparel recognition, deep learning approaches, among other such approaches.

In accordance with various embodiments, the content recognition service can receive, for example, video and/or other data. In this example, the content is video data. It should be noted that in some embodiments, an image can include a picture, a video frame that is a part of a video, and/or an animation frame that is a part of an animation. For example, one or more frames can be extracted or sampled from the video and/or animation to make up the one or more images. The video data can be segmented into one or more reference frames or keyframes. A reference frame can be, for example, an image that represents a summary of a portion of video data. In accordance with various embodiments, a video frame, for example, can be any basic sub-unit of a larger item or collection of digital media. For instance, a video data can be a sequence of still images, and each still image can be a frame. Similarly, a collection of images can be viewed conceptually as a sequence of still images, similar to that of video data. For such a sequence, or collection, each single image can be a frame. For streams, documents, or document collections consisting of audio, text, and/or other digital media, a frame can be a subset of the collection. Such types of media may be divided into sub-units of any length for analysis. In these examples, frames can include audio or text excerpts from longer streams. It should be noted that the use of frame herein is not intended to be limited to digital video or collections of digital images, and is used to refer to any sub-unit of any form of digital media.

A segment or shot can be a set of frames from a larger item or collection of digital media. For example, digital media, can be segmented into groups of frames according to various criteria to facilitate browsing and navigation. A segment may be any portion or subset of a larger item or collection of digital media. Alternatively, a segment could also be the entire item of digital media. For example, a segment may be a collection of digital images, or any portion of a digital video, regardless of its source or length (including the entire video). A keyframe or reference frame is a frame that is selected from a segment (set of frames) as a representative for that segment of digital media. A reference frame or keyframe can be a representative frame of the segment or shot.

Segmenting video can include, for example, using video analysis and related algorithms to identify 'shots.' A shot can be a contiguous sequence of frames that are largely similar, visually. Similar video is video is video that includes at least a minimum level features descriptors or other features that match at least a threshold amount. For example, if a video shows two people talking in a restaurant, there may be one camera on person A, and another on person B, and perhaps a third showing both in profile facing one another at the table. A shot would typically be a segment from one of those cameras, usually as that person is talking.

Shots can be identified by, for example, computing an overall similarity metric between individual frames of video based on the pixel values at each position, and then applying a threshold which, when crossed, indicates a new shot has been entered.

Once shots have been determined, they can be compared for overall similarity. In the example above, the shots from the camera on person A will generally be more similar to one another than any are to shots from the other two cameras. Shots from the three different cameras may then be assigned a label, a, b, or c, and there is a pairwise similarity metric between shots.

In accordance with various embodiments, the selection of a reference frame or keyframe from the segment or shot can be accomplished in a number of ways. At least some approaches can begin with the decomposition of the video into temporal segments (e.g., shots or scenes) and then extract a number of keyframes per temporal segment. For example, in accordance with an embodiment, the selection of the middle frame of each shot may can be designated the reference frame. In another example, low-level visual information of all video frames (or all shot frames or all scene frames) can be used to group frames using, e.g. k-means, and then frames can be selected as reference frames that are more similar to the groups centers of the groups. In another example, the video can be decomposed into segments based on inter-frame cosine similarity and the keyframes can be selected with k-means where k can be proportional to the length in time of the segment.

Once the keyframes are determined, the keyframes can be analyzed to identify content. For example, in some embodiments, the content recognition service can be configured to perform an object recognition process with respect to the video. For example, faces, products, music album covers, book covers, shapes, colors, and/or other objects included in an image can be recognized using the object recognition process. In one such example, face or head detection algorithms can be utilized to attempt to locate an approximate head or face portion in a keyframe. The head or face detection algorithm can include, for example, any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like.

In various embodiments, in order to detect other objects, at least some embodiments can utilize approaches or algorithms that utilize local features or other such representative points to represent a pattern. Accordingly, video data or other content can be analyzed to extract feature descriptors of features from the video data and visual words can be assigned, for example via a classification module 420. These features then can be used in a search vocabulary and a list of potential words created, that may be stored in an object data store 422. Each determined visual word can then be compared against groups of visual words stored in an index of visual words by a search engine in a manner similar to that employed by text retrieval techniques. As a result, a group of closest matching index images that at least partially match the local features can be determined based at least in part upon matching visual words. The matching index images can be used to provide advertisements and/or related content to user's device, as will be described below.

In various embodiments, the classification module 420 can attempt to classify or label the identified content and/or the source(s) of the content (e.g., images, audio, text, video) based at least in part on the word(s) or phrases identified in that content, and/or other distinguishing features. In some instances, a library or database can store a set of already defined data such as a set of defined words, phrases, feature descriptors, etc. The defined data can be already known, labeled, classified, preset, preconfigured, etc., to be associated with a particular classification or label. In some embodiments, the classifier can compare the identified content portion(s) against the defined data, in order to identify one or more pieces of defined data that substantially match (i.e., match within an allowable deviation) the identified content portion(s). Moreover, in various embodiments, a match may be determined if it falls within a confidence level, or the like.

It should be appreciated that the object data store 422 may be specifically curated or developed for use with supplemental content. For example, the object data store 422 may include brand names, celebrities, and the like which may be related to supplemental content for various advertisers. For example, if a certain celebrity becomes a spokesperson for a brand, that celebrity may be included within the object data store 422 to enable quick detection that certain supplemental content is related to the brand whenever the celebrity is detected.

In various other embodiments, video content can be transformed into feature descriptors and compared to stored feature descriptors objects, such as those in the object data store 422. For example, in the situation where content includes video data, the system can extract features from each of the images using a feature extraction algorithm (e.g., Accumulated Signed Gradient) and transform the extracted features for each image into feature descriptors which can be compared against stored feature descriptions. In this way, typical image matching algorithms can take advantage of the fact that an image of an object, frame or scene contains a number of feature points (e.g., specific points in an image that are robust to changes in image rotation, scale, viewpoint or lighting conditions).

In various embodiments, the descriptor determination can include functionality to analyze a color palette, lighting, audio fingerprint, and other elements of the video while processing the videos. In this respect, the content recognition service can be based on groupings that are not solely object driven but rather based on groupings with a common color scheme, audio fingerprint, or other related aspects. The descriptors are compared against the correlated descriptors stored in descriptor database. Matching scores can be determined and returned for each of the comparisons. In this example, each of the matching scores represents a confidence for how well a one of the determined descriptors matches a stored descriptor. The comparison with the highest matching score is identified as a match and information associated with the match can be provided the advertisement server to determine one or more advertisements to display to the user on their computing device.

In certain embodiments, video content (e.g., the supplemental content described in FIGS. 1 and 3) can be analyzed using a text recognition component, which may be part of the recognition module 418, to identify text such as logo, brands, etc. that can be utilized for classification of the scene. For example, the text recognition component of the recognition module 418 can be configured to perform an optical character recognition (OCR) process with respect to the content. For example, words or characters included in an image that are not yet machine-encoded can be converted into machine-encoded (i.e., machine-readable) text using the OCR process. Additionally, in various embodiments, the recognition module 418 may further include an audio recognition component to receive audio and attempt to recognize or identify one or more audio portions included in the audio content item. In one example, the audio recognition module can be configured to perform a speech recognition process, such as a speech-to-text process, in attempt to recognize/identify one or more words included in the audio content. Identified words can be utilized to determine context of the scene, which may facilitate classification of the scene.

Accordingly, information (e.g., feature descriptors, individual words, combinations of words, phrases, etc.) determined from the content recognition service 416 can be used to classify the content or source of the content in the video and/or other data.

The content analysis environment 406 further includes a recommendation service 424 that may analyze the classifications from the content recognition service 416 to provide recommendations for targeting criteria for use with one or more advertising campaigns. In the illustrated embodiment, the recommendation service 424 includes a key word data store 426, which may be developed and/or curated to facilitate identification of components for advertising or supplemental content purposes, which may enable identification of similar supplemental content. Similar supplemental content may include supplemental content having a threshold similarity, which may be determined by matching a certain percentage of key words, a single key word, or determining key words that are closely related to one another. For example, the key word data store 426 may include words or phrases typically associated with supplemental content providers, such as brand or product names. Moreover, the key word data store 426 may also include synonyms and the like of other words to provide a range of options identifying key words that may be used to determine related supplemental content. Moreover, it should be appreciated that the key word data store 426 may further include key words or phrases learned from other advertisements or from a general dictionary or data set.

In various embodiments, a context module 428 may also be implemented within the recommendation service 424 to analyze a context or situation that may be identified within the supplemental content. For example, certain combinations of identifications may lead to a contextual determine of an occurrence. In an example, identification of words such as "mountain" and "gloves" and "goggles" may be indicative of an outdoor, mountainous scene. Other items may be associated with or otherwise accompany those identifications, such as skis, snowboard, mountain climbing, and the like. Accordingly, the context module 428 may evaluate the classifications and their associated key words to determine a context of the supplemental content, which may facilitate further identification of key words from the key word data store 426.

The illustrated recommendation service 424 further includes a criteria generator 430, which may suggest other types of targeting criteria for creative content, such as time for deployment, and the like. For example, analysis of the creative content may include keywords such as "children" and "toy" and, therefore, the criteria generator 430 may recommend rules for deployment of the creative content, such as when children are likely watching.

The prediction service 432 of FIG. 4 includes a training data store 434 that may collect previous campaigns and the like, along with their success rates, in order to determine which key words and/or targeting criteria have previously had success with different types of inventory (e.g., primary content). For example, previous campaigns where sports drink advertisements were successful when shown during sporting events may be identified and logged. It should be appreciated that various aspects of various campaigns may be stored within the training data store 434, including conversion rates or success metrics (as defined for the particular campaign), a time the advertisement was shown, a segment of inventory where the advertisement was shown, and the like. As a result, information may be evaluated to establish key value pairs for key words having success with certain inventory and/or certain criteria.

The illustrated embodiment further includes a comparison module 436, which may be utilized to compare different creative criteria, such as key words or targeting criteria, against the key words or targeting criteria from the recommendation service 424 or historical campaigns, among other things. For example, the comparison module 436 may evaluate how many different key words have been identified in creative content, and compare those key words to key words in historical content to determine supplemental content that may be considered similar. Additionally, the comparison module 436 may be utilized to compare scores between different key words or targeting criteria, for example based on a score developed by the scoring module 438.

In various embodiments, the scoring module 438 may score or otherwise rate targeting criteria based on inventory and/or other criteria related to the campaigns, such as time of the day the advertisement is shown, or the like. In various embodiments, the scoring module 328 may establish a baseline success metric, such as a conversion, viewing event, click, or the like. It should be appreciated that success metrics may be defined differently. For example, a successful deployment may include a video ad being viewed for a certain period of time (or certain percentage of the total duration), a click, a purchase, or the like. Accordingly, it should be appreciated that different scores may be related to different definitions of success metrics and may, in various embodiments, relate to the success metric definition provided in the campaign being analyzed. Once the scores are determined, key value pairs may be provided illustrating different key words and/or targeting criteria and associated inventory having a conversion rate, or some other success metric, above a threshold amount. The comparison module 436 may evaluate the scores of both the provided targeting criteria and the recommended targeting criteria to determine whether adjustments would be advantageous to the campaign.

In various embodiments, the advertiser may be contacted to adjust the campaign and/or aspects of the campaign. For example, the advertiser may be provided with suggestions that are either approved or rejected by the advertiser. In other embodiments, the adjustments may be provided automatically in order to provide a campaign that is predicted to have higher performance. Thereafter, the convent generator 414 may receive information, for example, from the recommendation service 426, to provide content that includes the requested primary content along with the supplemental content.

It should be appreciated that while various modules and the like may be illustrated as being incorporated into or part of other systems, that these modules and/or systems may be separate and may also further include other components. Moreover, the modules and systems described herein may further be provided, at least in part, by third party services in data communication with the provider.

Figure 5:
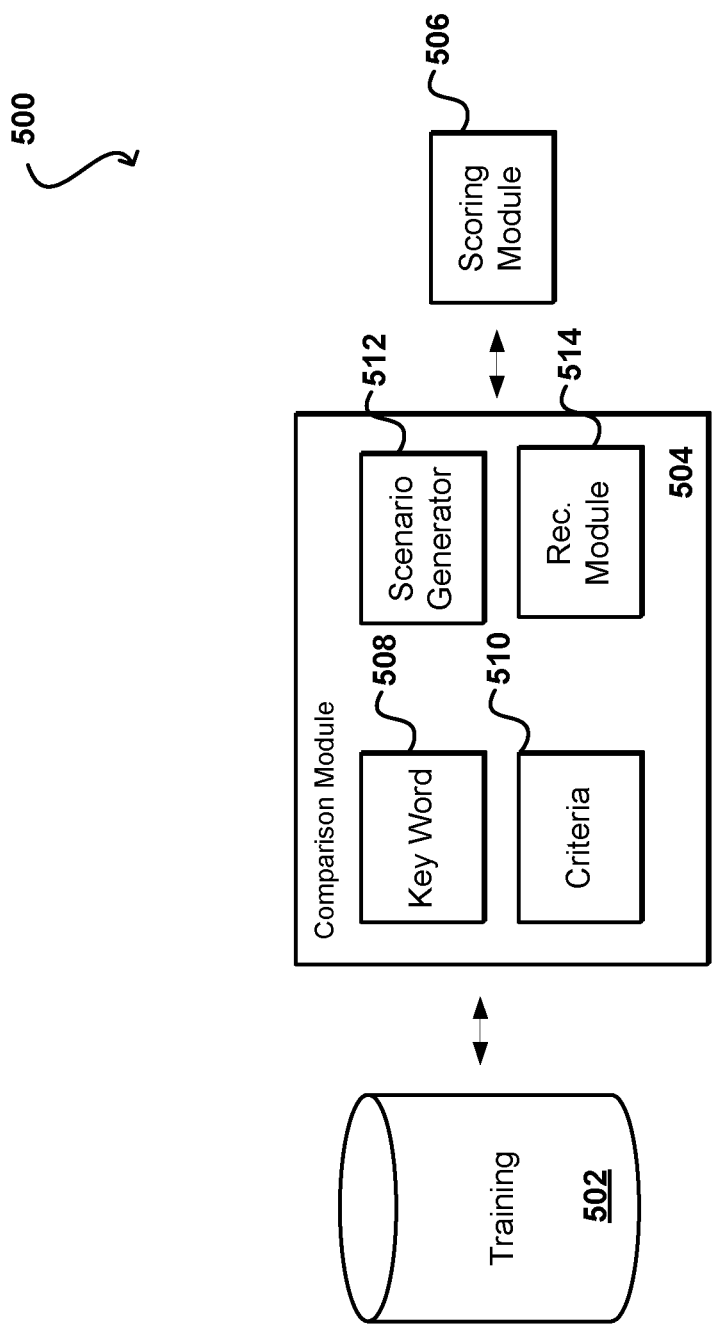
FIG. 5 illustrates an example system for predictive analysis of supplemental content that can be utilized in accordance with various embodiments.

FIG. 5 illustrates an example prediction service 500 including the training data store 502, comparison module 504, and scoring module 506 described above. In the illustrated embodiment, the comparison module 504 further includes a key word module 508, a criteria module 510, a scenario generator 512, and a recommendation module 514. In various embodiments, the comparison module 504 may be utilized to evaluate whether historical campaigns or creative are similar to given creative content. This comparison may then be utilized to analyze different targeting criteria for similar campaigns to how different targeting criteria may provide improved campaigns.

In the illustrated embodiment, the key word module 508 may include a list or a subset of the key words provided from the line items and/or the identified key words. In various embodiments, these key words may be utilized to identify similar campaigns, which may include campaigns having the same or a certain number of the same key words. A criteria module 510 is also included, which may be utilized to adjust or evaluate different criteria of the campaigns. For example, criteria may be related to inventory, time of day the advertisement runs, which parts of the inventory the advertisement is associated with, and the like. In an example, an advertising campaign specifying criteria such as halftime during a championship soccer game would have criteria associated with inventory (championship soccer game), part of the inventory (halftime) and time (date of the game). In various embodiments, adjustments or differences in criteria may impact performance of the advertisement. For example, an advertisement shown during prime time is likely to have more viewers than one that runs in the middle of the night. Furthermore, advertisements shown during different programs may be more effective, if for example, the advertisement is related to the program. Accordingly, the criteria module 510 may be utilized to evaluate and adjust criteria in different scenarios to try to establish a score and determine if any adjustments would improve the score.

In various embodiments, a scenario generator 512 may evaluate different aspects of the campaigns and also develop new campaigns to evaluate via the scoring module 506. For example, the scenario generator 512 may evaluate identified historical campaigns with similar key words using the same criteria as the specified campaign to see if different targeting criteria leads to higher scores. Additionally, in various embodiments, the scenario generator 512 may adjust or otherwise change different factors to see how adjustments would impact the score. It should be appreciated that, in various embodiments, the scenario generator 512 may also provide information on how adjustments would impact costs of the campaign.

A recommendation module 514 evaluates different scores provided by the scoring module 506 and provides recommendations for different targeting criteria. These recommendations may be in the form of key value pairs that identify certain key words and associated inventory, for example. Additionally, other types of recommendations, such as adjusting when an advertisement is shown, may also be provided by the recommendation module 514.

Figure 6:
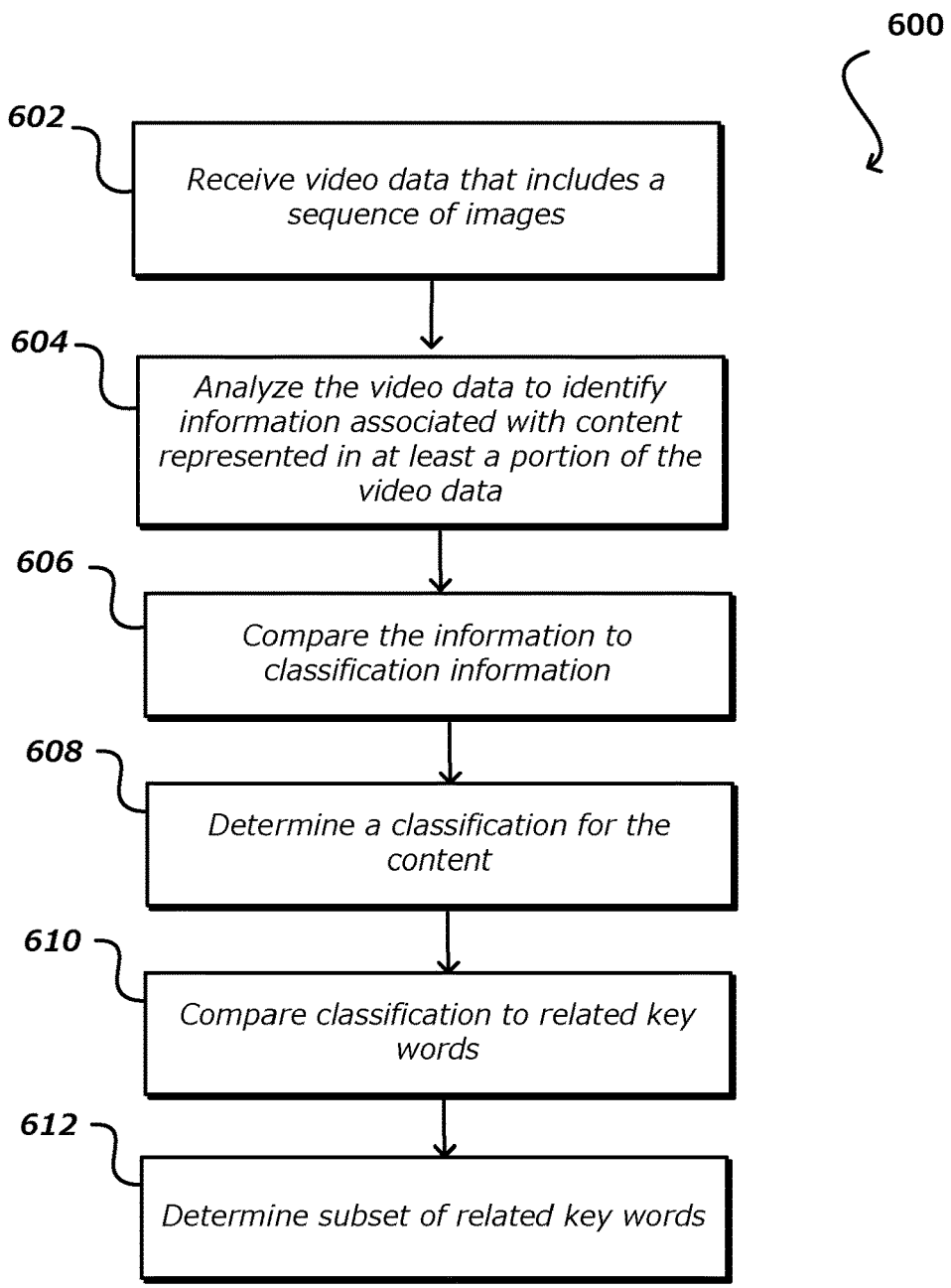
FIG. 6 illustrates an example processes for content classification that can be utilized in accordance with various embodiments.

FIG. 6 illustrates an example method embodiment 600 for content classification based on data recognition. It should be understood that there can be additional, fewer, or alternative steps performed in similar or alternative orders, or in parallel, within the scope of the various embodiments unless otherwise stated. Video data and/or other data or content that includes a sequence of images can be received 602. In some embodiments, the content item can include at least one of video, an image, an audio, or text. In some embodiments, an image can include a still frame that is part of a video. In some embodiments, audio can include sound extracted from a video.

The example method can analyze 604 the video content to identify information associated with content represented in the video content, for example from a frame or segment of the video content, using at least one of an image recognition process, an audio recognition process, or a text recognition process. This can include determining identification information representative of content included in the video content (or at least a segment of the video content). Identification information can include, for example, feature points, feature descriptors, a model that incorporates a combination of identification information, etc.

In an example, analyzing the video content can include, determining an object represented in at least a portion of the video content, comparing the object to a plurality of stored objects to determine a match between the object and one of the stored objects, the stored object being associated with a word, associating the word with the object, and classifying the segment of the video content including the object with the word.

The information can be compared 606 to classification information to assign a classification to at least a portion of the video content, as described above. For example, the classification may be related to an object within the video content or a word or phrase uttered during the video content. Thereafter, classification for the video content, or at least a segment of the video content, can be determined 608. For example, if various different classifications are identified over a period of time, the various objects may be analyzed or evaluated to determine how alike they are to one another. In an example, a scene with a driver navigating a car through a city may include classifications such as "car" and "driving" and "pursuit," but may also include secondary classifications such as "hands" for the driver's control of the steering wheel or "tree" if the driver goes past a park. These features may be less important to the scene itself than the classifications of the car, and as a result, my not be assigned to the scene.

In various embodiments, the classification generates a set of key words, which may be compared to a related set of key words 610. The related set of key words may be from a data store, for example, and may be determined based at least in part on the classification of the objects. For example, the classification may include labels that form at least a basis of the key words, which may be used to identify additional key words from the data store 612. In various embodiments, the determined related key words are a subset of the key words evaluated in the data store, as some key words may be less related when compared, for example, to a group of key words as a whole.

Figure 7:
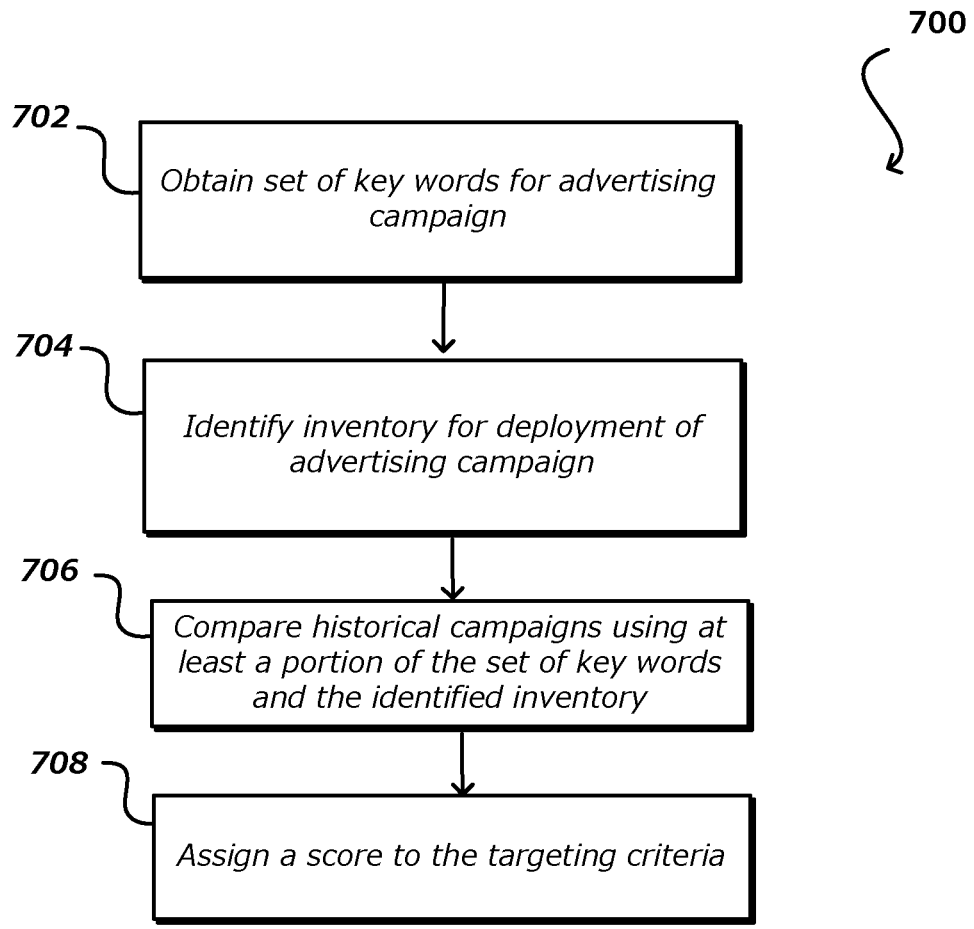
FIG. 7 illustrates an example process for campaign scoring that can be utilized in accordance with various embodiments.

FIG. 7 illustrates an example method 700 for analyzing targeting criteria for line items provided as part of an advertising campaign. In this example, a set of key words is obtained 702. For example, an advertising campaign may include line items for targeting or otherwise implementing an advertising campaign. Inventory that may be suitable for the advertising campaign is identified 704. For example, key words provided along with the campaign, or other targeting criteria, may be analyzed to identify inventory. The inventory includes primary content that may be utilized with the advertisement (e.g., supplemental content). As described above, the supplemental content may be positioned before, after, or during the primary content. Embodiments further include analysis of the key words and/or targeting criteria against inventory. For example, historical campaigns using similar or the same key words may be analyzed against similar inventory 706. The analysis may focus on success rates of the campaigns, which may be individually defined by factors such as conversion rates and the like. The historical campaign information may be collected and processed through a machine learning system, as described above, to identify, for example, key value pairs that have high success rates. In other words, the key words and/or targeting criteria associated with the similar campaigns having high success rates may be identified via the machine learning analysis of the historical campaigns. A score may be determined by analyzing the historical campaign against a success metric 708. This score may be for the key word and/or for the targeting criteria, which may be referred to as a score for the supplemental content. For example, the score may be indicative of how successful a particular historical advertisement (which may include similar key words to the evaluated advertisement) against particular primary content criteria. The score may be indicative of how the advertisements having certain key words and/or targeting criteria are likely to perform with the targeted inventory. For example, as described above, advertisements and associated targeting criteria that are likely to perform well, or have a history of performing well, with the inventory may have higher scores than advertisements that are not. In certain embodiments, these high performing advertisements may be associated with key words that have a relationship or other association with the primary content. Furthermore, these high performing advertisements may have positive targeting criteria, such as identifying primary content associated with the key words, showing the advertisements at a particular time, and the like. The score may provide insight into the likely success of the campaign. Furthermore, as will be described below, the score may further provide an opportunity to test or otherwise predict how the advertisement would perform with different inventory, among other adjustments.

Figure 8:
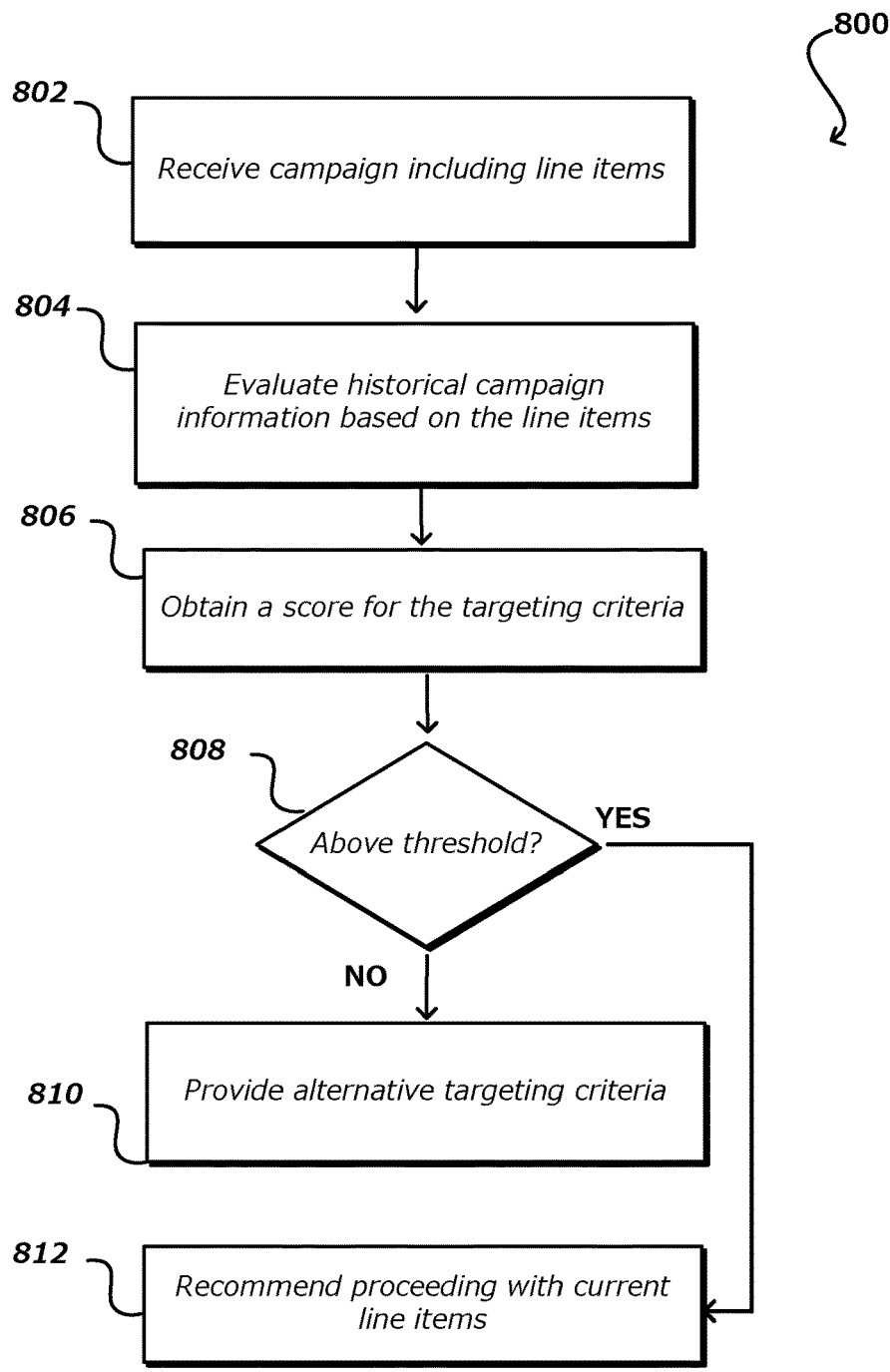
FIG. 8 illustrates an example process for campaign evaluation that can be utilized in accordance with various embodiments.

FIG. 8 illustrates an example method 800 for providing alternative recommendations for advertising campaigns. In this example, an advertising campaign is received 802. The campaign includes at least one line item, which may include creative (e.g., supplemental content), key words describing the supplemental content, and targeting criteria for deploying the advertising campaign. As described above, the line items may include key words for identifying various types of inventory associated with the advertisement and/or identifying similar advertisements. Furthermore, the targeting criteria could include specific targeted inventory, times of day for deployment, and the like.

In embodiments, the received campaign is evaluated against historical information 804, which may be utilized to develop a machine learning system. The analysis may evaluate how similar campaigns have performed in the past. For example, advertisements associated with (e.g., described by) similar key words may be evaluated against similar inventory or against similar targeting criteria (which may include targeted inventory, in various embodiments). Moreover, other features of the criteria may be evaluated, such as the time of day the advertisement is shown. In this example, a score is assigned to the targeting criteria and/or key words 806. The score may be individually assigned, such as particular aspects of the targeting criteria may obtain a score, which may be different than other aspects. Moreover, different aspects of the campaign may receive different scores. For example, the key words that associate the supplemental content with certain inventory may have high scores, but the time of day for deployment may receive a low score. The score is evaluated, for example, against a threshold 808. The threshold may be established based on a success metric for a campaign, which may be related to conversion rates, click through rates, duration the advertisement is viewed, or the like.

In various embodiments, if the score (e.g., one or more scores) does not exceed the threshold, alternatives may be provided 810. The alternatives may include different targeting criteria, such as different inventory, different deployment times, and the like. However, if the score or scores do exceed the threshold, then a recommendation to proceed with the campaign and/or a line item of the campaign may be provided 812. In this manner, campaigns and/or particular line items of campaigns may be analyzed and scored prior to deployment. It should be appreciated that the additional targeting criteria may also be provided as suggestions, even when the scores are above the threshold, as using more information may lead to an improved campaign.

Figure 9:
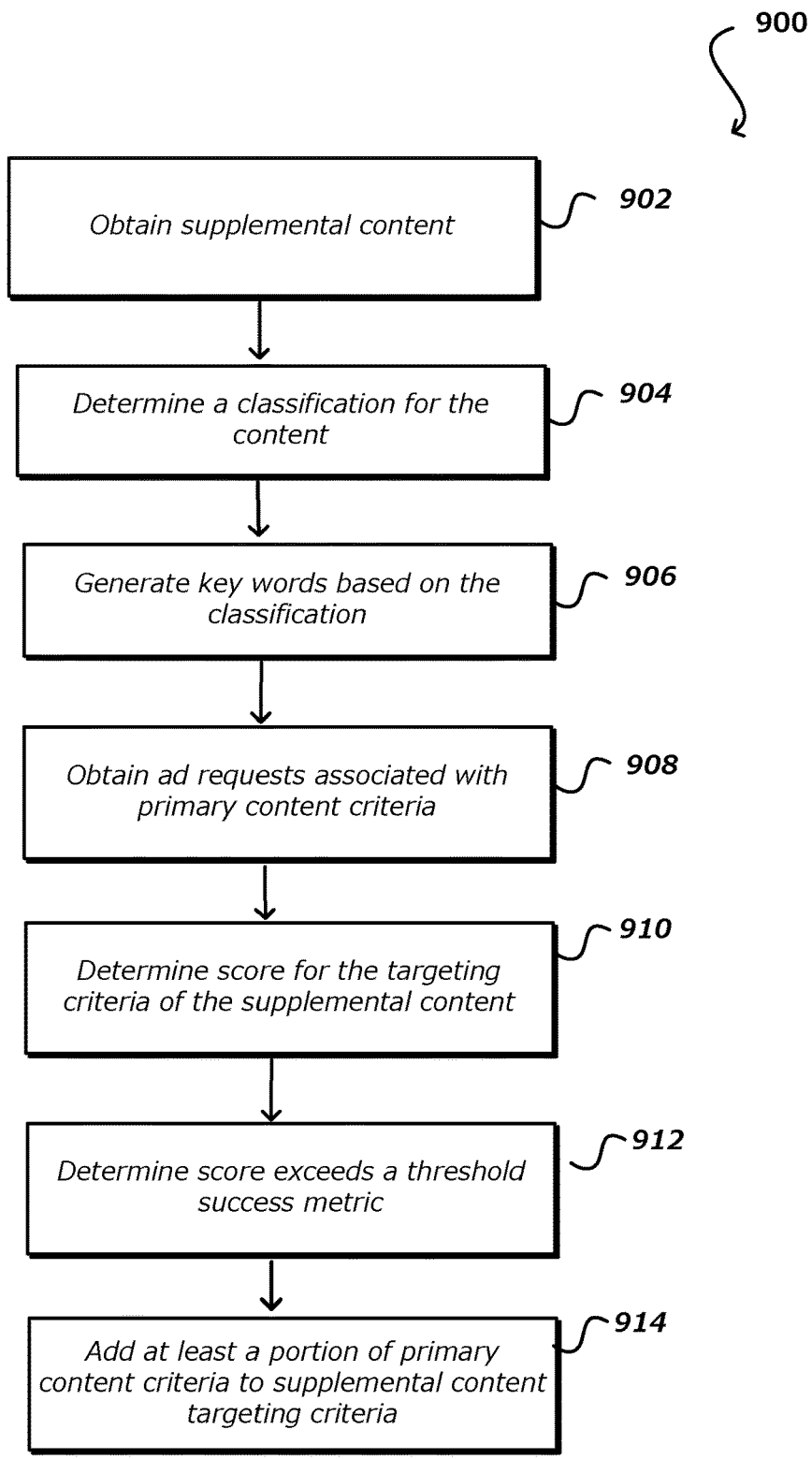
FIG. 9 illustrates an example process for campaign evaluation and recommendation that can be utilized in accordance with various embodiments.

FIG. 9 illustrates an example method for obtaining and evaluating campaigns, based at least in part on identified key words from supplemental content. In the illustrated embodiment, supplement content is obtained 902. The supplemental content may include, for example, a video advertisement, which may include video, audio, text, or a combination thereof. Thereafter, the supplemental content is evaluated with a machine learning system and objects are identified and classified 904. For example, object recognition may identify different objects. Text recognition may identify brand names. Key words are generated based on the classification 906. For example, in various embodiments, the classification includes a label to identify the object, and as a result, that identification may be utilized as a key word. Moreover, as described above, in various embodiments context evaluators and the like may provide further key words based on the classification.

In various embodiments, ad requests associated with primary content are obtained 908. The ad request may be for streaming video content and may include key/value pairs that the publisher has associated with the primary content. These key/value pairs may be referred to as primary content criteria or publisher content descriptions. A score is determined for the supplemental content in view of the key/value pairs associated with the primary content of the ad request 910. As described above, the score may be based, at least in part, on an evaluation of historical campaigns using similar key words and/or inventory. For example, similar campaigns may be evaluated against the inventory and/or against different types of targeting criteria. The score may be based, for example, on how particular key words score. Additionally, the score may be based on certain aspects of the targeting criteria. The score is evaluated against a threshold, and it may be determined that the score exceeds the threshold 912. Thereafter, the key/value pairs (or other targeting criteria of the historical campaigns) may be added to the targeting criteria of the supplemental content 914. It should be appreciated that the publisher targeting criteria may not be added automatically, and instead, a message may be distributed to the advertiser recommending the addition of the targeting criteria.

Figure 10:
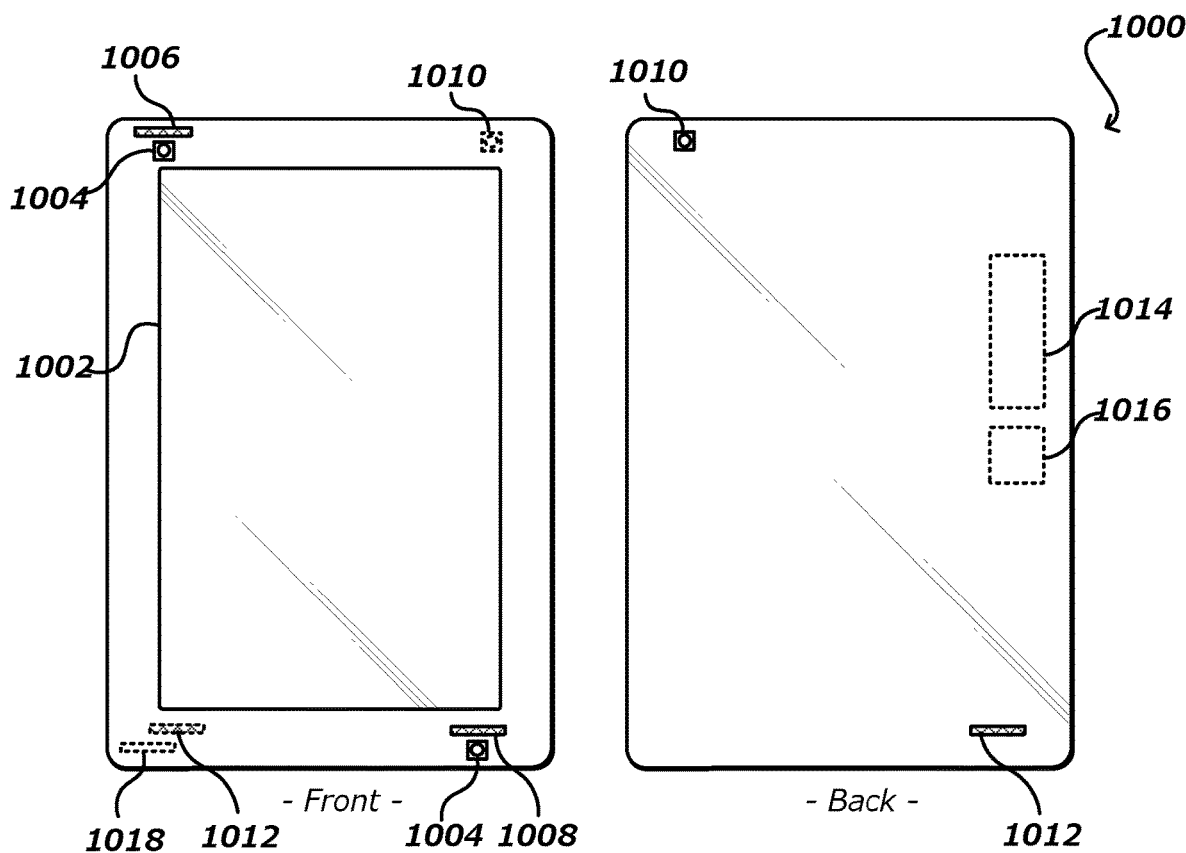
FIG. 10 illustrates an example device that can be used to implement aspects of the various embodiments.

FIG. 10 illustrates front and back views of an example electronic computing device 1000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled device (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1008 on the front side, one microphone 1012 on the back, and one microphone 1006 on or near a top or side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1014, such as may include at least one wired or wireless component operable to communicate with one or more electronic devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

Figure 11:
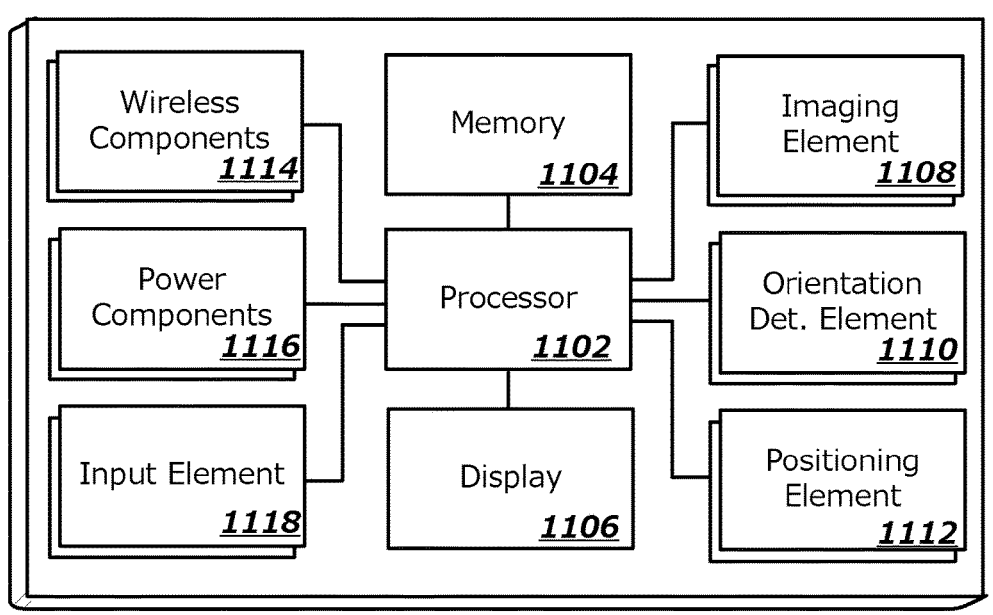
FIG. 11 illustrates example components of a client device such as that illustrated in FIG. 10.

FIG. 11 illustrates a set of basic components of an electronic computing device 1100 such as the device 1100 described with respect to FIG. 10. In this example, the device includes at least one processing unit 1102 for executing instructions that can be stored in a memory device or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices.

The device typically will include some type of display element 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 12:
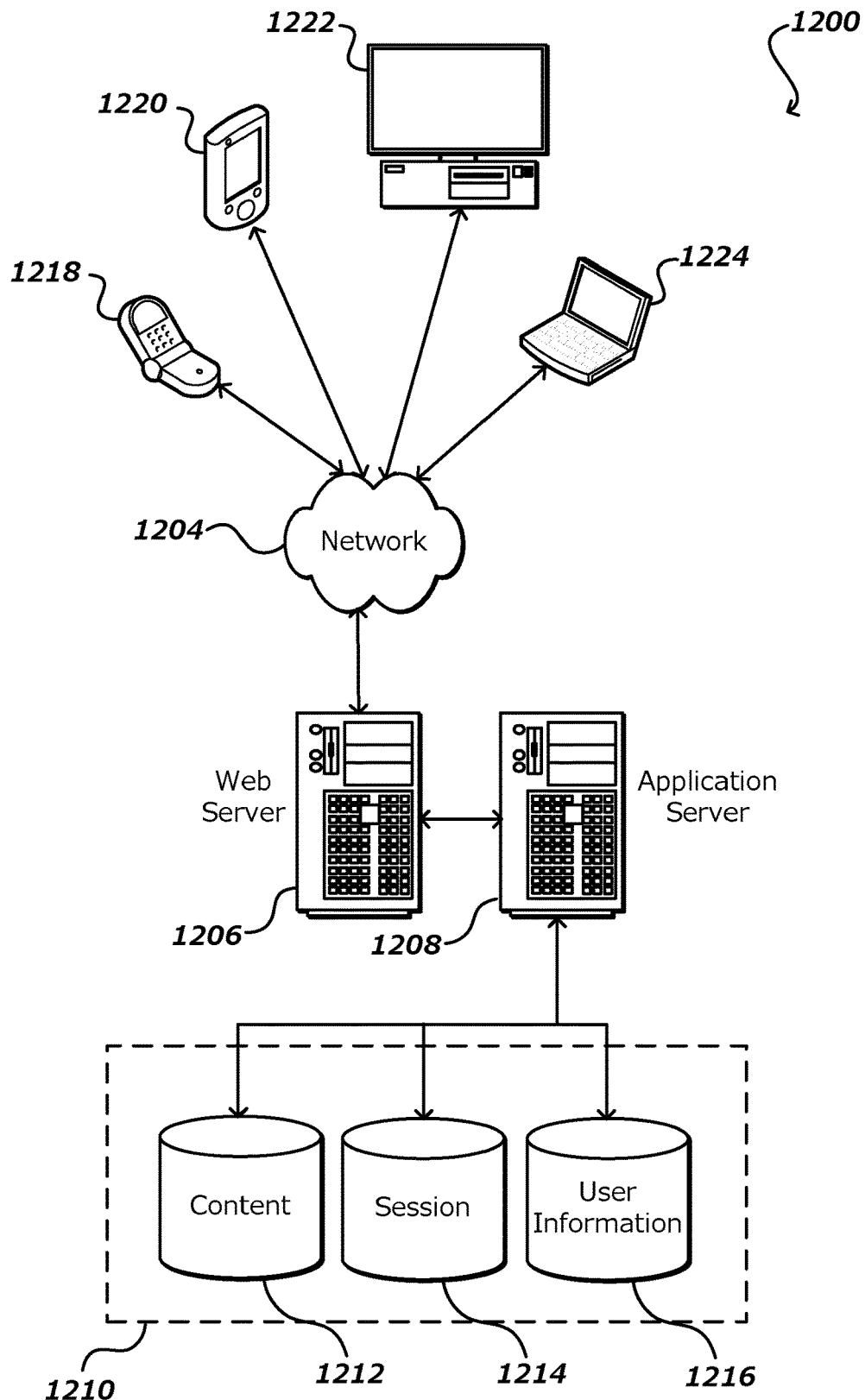
FIG. 12 illustrates an environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes electronic client devices 1218, 1220, 1222, and 1224, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client devices 1218, 1220, 1222, and 1224 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1218, 1220, 1222 and 1224. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining supplemental content for inclusion with primary content;
   identifying one or more objects within the supplemental content using at least one of object recognition, text recognition, or audio recognition;
   classifying the one or more objects;
   determining key words, based at least in part on the classification of the one or more objects, the key words being associated with the supplemental content, the keywords being related to one another and associated with a primary classification having a higher relevance than a secondary classification;
   obtaining primary content criteria, the primary content criteria classifying one or more features of the primary content;
   determining a score for the supplemental content with respect to the primary content criteria, the score being based, at least in part, on a performance of historical supplemental content with respect to the primary content criteria, the historical supplemental content having at least one historical key word related to the key words, the at least one historical key word corresponding to the primary classification;
   determining the score for the supplemental content exceeds a threshold;
   updating targeting criteria for the supplemental content to include at least a portion of the primary content criteria;
   receiving a request for a supplemental content stream;
   selecting, based at least in part on the targeting criteria, the supplemental content; and
   generating a combined content stream, the combined content stream including the supplemental content and at least a portion of the primary content.

2. The computer-implemented method of claim 1, further comprising:
   obtaining line items from a provider of the supplemental content, the line items including provider targeting criteria;
   determining the score for the provider targeting criteria with respect to the first primary content of the primary content, based at least in part on the historical supplemental content;
   determining the score for the provider targeting criteria is below a success metric; and
   providing a notification to the provider recommending removal of the provider targeting criteria.

3. The computer-implemented method of claim 1, further comprising:
   obtaining line items from a provider of the supplemental content, the line items including provider targeting criteria;
   determining the score for the provider targeting criteria;
   determining the score exceeds a success metric; and
   providing a recommendation to proceed with the provider targeting criteria.

4. The computer-implemented method of claim 1, wherein the score for the supplemental content is based, at least in part, on the targeting criteria of the supplemental content.

5. A computer-implemented method, comprising:
   obtaining a key word associated with supplemental content;
   comparing the key word with a set of key words;
   determining the key word is related to the set of key words;
   forming a key word group, including at least the key word and at least a portion of the set of key words;
   obtaining primary content criteria, the primary content criteria being provided in response to a request;
   determining a score for the key word group with respect to the primary content criteria, the score being based, at least in part, on a performance of historical supplemental content, the historical supplemental content being deployed with primary content having the primary content criteria;
   determining the score for the key word group exceeds a threshold;
   updating targeting criteria for the supplemental content to include at least a portion of the primary content criteria;
   receiving a request for a supplemental content stream;
   selecting, based at least in part on the targeting criteria, the supplemental content; and
   generating a combined content stream, the combined content stream including the supplemental content and at least a portion of the primary content.

6. A computer-implemented method of claim 5, further comprising:
   obtaining supplemental content;
   identifying one or more objects within the supplemental content using at least one of object recognition, text recognition, or audio recognition;
   classifying the one or more objects with one or more key words.

7. A computer-implemented method of claim 5, further comprising:
   obtaining a campaign from a provider, the campaign including line items having one or more provider key words associated with supplemental content.

8. The computer-implemented method of claim 7, further comprising:
   determining a respective score for each of the one or more provider key words;
   determining at least one respective score is below the threshold; and
   providing a recommendation to revise the targeting criteria for at least a portion of the campaign.

9. The computer-implemented method of claim 5, further comprising:
   obtaining a second key word associated with the supplemental content;
   determining a second score for the second key word, with respect to the primary content criteria;
   determining the second score for the key word is below the threshold; and providing a recommendation to revise the targeting criteria for the supplemental content.

10. The computer-implemented method of claim 5, further comprising:
    determining a second score for the key word with respect to second primary content criteria, the score being based, at least in part, on a performance of historical supplemental content with respect to the second primary content criteria;
    determining the score for the key word exceeds the threshold; and
    providing a recommendation to add the secondary primary content criteria as targeting criteria for the supplemental content.

11. The computer-implemented method of claim 5, wherein the historical supplemental content includes at least one historical key word associated with the key word.

12. The computer-implemented method of claim 5, further comprising:
    receiving an instruction, from the provider, to update the targeting criteria for the supplemental content; and
    updating the targeting criteria, in response to the instruction.

13. The computer-implemented method of claim 5, further comprising:
    obtaining criteria for the supplemental content associated with the key word, criteria including at least one of a deployment time for the supplemental content or a deployment genre for the supplemental content;
    obtaining historical criteria for the historical supplemental content;
    determining a criteria score for the supplemental content, the criteria score based at least in part on the performance of historical supplemental content;
    determining the criteria score exceeds a criteria threshold; and
    providing a recommendation to add the primary content criteria as targeting criteria for the supplemental content.

14. The computer-implemented method of claim 5, wherein the supplemental content is associated with an advertising campaign, the advertising campaign including at least one of key words, criteria for deployment, or identified primary content for deployment.

15. The computer-implemented method of claim 5, wherein the score is based on a success metric.

16. A system, comprising:
    at least one processor; and
    memory including instructions that, when executed by the at least one processor, cause the system to:
        obtain a key word associated with supplemental content;
        compare the key word with a set of key words;
        determine the key word is related to the set of key words;
        form a key word group, including at least the key word and at least a portion of the set of key words;
        obtain primary content criteria, the primary content criteria being provided in response to a request;
        determine a score for the key word group with respect to the primary content criteria, the score being based, at least in part, on a performance of historical supplemental content, the historical supplemental content being deployed with the primary content having the primary content criteria;
        determine the score for the key word group exceeds a threshold;
        updating targeting criteria for the supplemental content to include at least a portion of the primary content criteria;
    receiving a request for a supplemental content stream;
    selecting, based at least in part on the targeting criteria, the supplemental content; and
    generating a combined content stream, the combined content stream including the supplemental content and at least a portion of the primary content.

17. The system of claim 16, wherein the instructions when executed further cause the system to:
    obtain supplemental content;
    identify one or more objects within the supplemental content using at least one of object recognition, text recognition, or audio recognition;
    classify the one or more objects with one or more key words.

18. The system of claim 16, wherein the instructions when executed further cause the system to:
    obtain a campaign from a provider, the campaign including line items having one or more provider key words associated with supplemental content
    determine a respective score for each of the one or more provider key words;
    determine at least one respective score is below the threshold; and
    provide a recommendation to revise the targeting criteria for at least a portion of the campaign.

19. The system of claim 16, wherein the instructions, when executed further cause the system to:
    obtain a second key word associated with the supplemental content;
    determine a second score for the second key word, with respect to the primary content criteria;
    determine the second score for the key word is below the threshold; and
    provide a recommendation to revise the targeting criteria for the supplemental content.

20. The system of claim 16, wherein the historical supplemental content includes at least one historical key word associated with the key word.

* * * * *